United States Patent
Paweletz (10) Patent No.: US 9,701,488 B2
(45) Date of Patent: Jul. 11, 2017

(54) TRANSPORT DEVICE

(71) Applicant: Robert Bosch GmbH, Stuttgart (DE)

(72) Inventor: Anton Paweletz, Fellbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/162,856

(22) Filed: May 24, 2016

(65) Prior Publication Data

US 2016/0347550 A1    Dec. 1, 2016

(30) Foreign Application Priority Data

May 26, 2015  (DE) ........................ 10 2015 209 625

(51) Int. Cl.
*B65G 35/00*    (2006.01)
*B65G 54/02*    (2006.01)
*H02K 41/03*    (2006.01)

(52) U.S. Cl.
CPC ........... *B65G 54/02* (2013.01); *H02K 41/031* (2013.01); *H02K 2201/18* (2013.01)

(58) Field of Classification Search
CPC ......... B65G 54/02; B60L 13/04–13/10; H02K 41/02–41/0358

USPC ......................................................... 198/619
See application file for complete search history.

(56) References Cited

U.S. PATENT DOCUMENTS

| | | | | |
|---|---|---|---|---|
| 5,094,173 A | * | 3/1992 | Tada | B60L 13/06 104/281 |
| 5,197,391 A | * | 3/1993 | Shimada | B65G 54/02 104/281 |
| 8,297,195 B2 | * | 10/2012 | Loser | B60L 3/00 104/249 |

FOREIGN PATENT DOCUMENTS

WO    2013/059934 A1    5/2013

* cited by examiner

*Primary Examiner* — William R Harp
(74) *Attorney, Agent, or Firm* — Maginot, Moore & Beck LLP (57) ABSTRACT

A transport device includes at least one mover that includes at least one base body, multiple permanent magnets, and at least one movable part. The multiple permanent magnets are connected to the at least one base body and cooperate with at least one coil plane of a drive surface so as to drive the at least one mover. The at least one movable part is connected to the at least one base body, and, in a lowered state, the at least one movable part brings the at least one mover into mechanical contact with the drive surface.

15 Claims, 8 Drawing Sheets

TRANSPORT DEVICE

This application claims priority under 35 U.S.C. §119 to patent application number DE 10 2015 209 625.4, filed on May 26, 2015 in Germany, the disclosure of which is incorporated herein by reference in its entirety.

BACKGROUND

The disclosure relates to a transport device.

Transport systems in which the transport bodies (so-called movers) are mounted in an almost friction-free manner in the electromagnetic field are known. The controllable electromagnetic forces are used both for driving the transport body and also for the electromagnetic linear support or levitation over a planar, electrically excited transport surface (also referred to as an X-Y stator). Such a system is described in WO 2013/059934 A1. The present disclosure is based explicitly on the subjects disclosed therein.

The drive system of the system that is disclosed in WO 2013/059934 A1 uses permanent magnets in the transport bodies that are provided in an X-Y Halbach arrangement. The magnetic field of these permanent magnets interacts with the magnetic field of electrical conductors in the stator that follow a specific X-Y arrangement that is tailored to suit the magnets. By virtue of the cooperation of the permanent-magnet Halbach systems having electromagnetic fields that occur in the stator as a result of energizing the conductor tracks, the driving forces that act on the transport body are generated in the directions X and Y and also a lifting force (bearing force) is generated in the Z-direction. The magnet systems in Halbach configurations in the mover comprise individual anisotropic separate rare earth magnets. The shape of the permanent magnets and the geometry of the winding system are matched to one another. Multiple current tracks extend in the stator in the directions X and Y in a perpendicular manner with respect to one another. The width of the current tracks and their spacings is tailored in the usual manner to suit the width and the pole spacing of the Halbach modules.

The object of the disclosure is to improve the safety of the generic-type transport device in the case of unexpected operating conditions and to make the entire system safe. The object is achieved by means of the features described below.

SUMMARY

The device in accordance with the disclosure having the features described below has in comparison the advantage that in particular the mover is safeguarded in the event of a loss of the energy being supplied to the stator part of the planar drive and potentially it is possible to operate the system with limited functionality in an emergency operational mode. This is achieved in accordance with the disclosure by virtue of the fact that the mover comprises at least one base body and a movable part, wherein the movable part is embodied so as to be able to move relative to the base body. The movable part can move at least in the direction of the drive surface.

As a consequence, the movable part counteracts a downwards movement of the entire mover on the drive surface. As a consequence, it is possible to prevent a user being trapped by a downwards-moving mover or to prevent the drive surface and/or the mover being damaged during the downwards movement. As a consequence, the operating safety is increased.

In one expedient further development, it is provided that at least one movement of the movable part relative to the base body occurs in dependence upon a magnetic field that is generated by the coil plane and/or in dependence upon a change in the magnetic field that is generated by the coil plane. This renders it possible for the mover to function in an automatic operating mode in dependence upon the flow of current in the coil plane. Moreover, the magnetic field that is generated in the normal operation by the coil plane can be used so as to supply the kinetic energy to the system, which renders it possible even in the event of a loss of current for the movable parts to move relative to the base body. As a result, it is also possible to forego a separate energy supply for the mover.

In one expedient further development, it is provided that the movable part comprises at least a ferromagnetic part. As a result, it is possible in a purposeful manner to introduce attraction forces of the magnetic field of the coil plane at the desired sites in the movable part. As a consequence, the efficiency of the arrangement increases.

In one expedient further development, it is provided that the movable part comprises at least one bearing means, preferably at least one roller, ball, slide bearing or suction element etc. As a result, it is possible to lower the movable parts onto the drive surface in a particularly gentle manner. Moreover, a suitable bearing means supports the opportunity of being able to manually move the mover by way of example even in the event of a current loss or to be able to operate in an emergency operational mode in the event of the central control system failing, in which for example the driving forces for the x-y movement continue to be provided as before by the central control system and the magnetic floating force in the z-direction is replaced by the conventional bearing forces of the above mentioned bearing means (rollers, balls, slide bearings). Moreover, if a suction element is used, it is possible to fix the mover to a vertical drive surface.

In one particularly expedient further development, at least one movement means such as by way of example a spring is provided that is arranged in a particularly preferred manner between the base body and the movable part. This variant renders it possible to forego a further energy supply for the mover. This is particularly important in the event of a failure in the supply voltage and ensures operational safety particularly in the emergency operational mode.

In one expedient further development, at least one guiding element is provided that is arranged between the base body and the movable part. It is particularly preferred that the guiding element cooperates with a helical groove that is formed between the base body and the movable part. As a result, it is possible to convert in particular a rotary movement into a translatory movement, so that the movable part is lowered towards the drive surface.

In one expedient further development, the ferromagnetic part is embodied as a ferromagnetic grid (embedded in a particularly light carrier element). It is particularly preferred that the ferromagnetic grid has the identical spacing to that of the coil plane. As a result, it is possible in a purposeful manner to provide a magnetic field on the movable part. As a consequence, the movable part can be of a light construction so that as a result of the mass inertia being lower than that of the base body it is possible to produce a very dynamic movement relative to the base body. For this purpose, the carrier element is embodied by way of example from a synthetic material or for example from a porous material in which the ferromagnetic grid is embedded.

In one expedient further development, the movable part comprises at least one frame or a frame part that is coupled by way of a lever mechanism to the movable part. As a consequence, it is also possible to convert movements of the movable part in the opposite direction relative to the base body into a movement of the frame part that is directed in an emergency operational mode towards the drive surface.

In one expedient further development, it is provided that, when the movable part is not in the lowered state, it is flush with the lower face of the mover, preferably with the lower face of the permanent magnets. As a result, it is possible to minimize the gaps in which contamination could collect.

In one expedient further development, it is provided that the movable part is arranged in the middle region of the mover and/or is surrounded by magnet arrays. As a result, it is possible to achieve a particularly stable position of the mover. Furthermore, the permanent magnets that are required for the drive function are not impaired in their arrangement that is particularly suitable for this purpose.

In one expedient further development, it is provided that the movable part is lowered in a critical operating state that is different from a normal operating state. As a consequence, it is possible to use defined idle positions of the mover to intercept safety-critical operating states.

Further expedient further developments are disclosed in the following description.

BRIEF DESCRIPTION OF THE DRAWINGS

Exemplary embodiments of the device in accordance with the disclosure are illustrated in the drawing and are further described hereinunder.

In the drawing.

DETAILED DESCRIPTION

Figure 1:
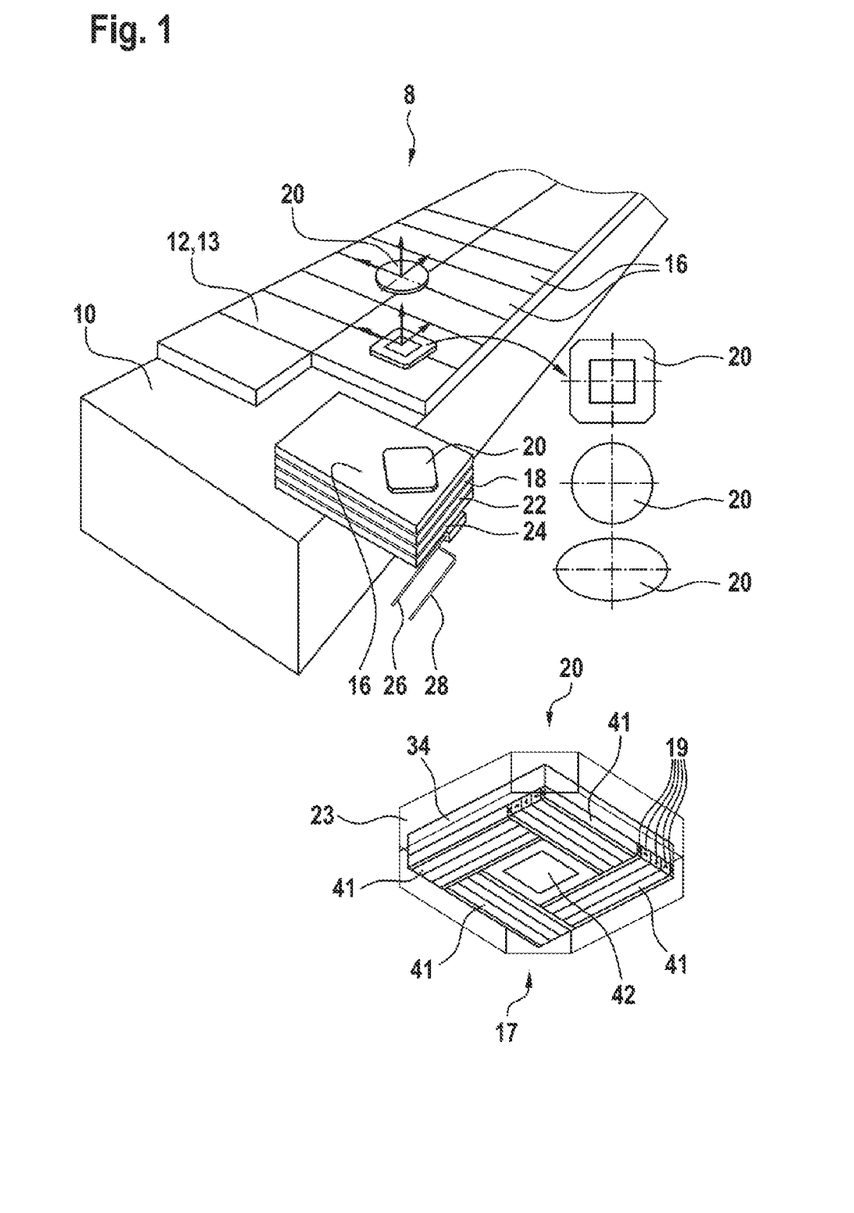
FIG. 1 is a system illustration of the device.

In the case of the exemplary embodiment in accordance with FIG. 1, by way of example two movers 20 are illustrated that have different basic shapes, namely one mover 20 that is essentially rectangular or one mover 20 that is round. An oval configuration would also be feasible. The carrier plate 12 or the drive surface 13 comprises a plurality of individual parts or tiles 16. The tiles 16 are square or rectangular in shape. The tiles 16 have essentially a planar surface and are built up in layers. The tile 16 is embodied in a square or rectangular shape. Thus, the tile 16 comprises a coil plane 18, a sensor plane 22 and an output electronic plane 24. Furthermore, a bus system 26 is provided that connects the tiles 16 to a central computer or processor, not illustrated. Furthermore, a voltage supply 28 is provided with associated connections by way of which the power electronic plane 24 or the coil plane 18 and/or the sensor plane 22 can be supplied with energy. The base platform 10 describes the base element. The base platform provides the necessary configuration options for the system in the space. The term "base platform" 10 is understood to mean the system carrier or a machine frame. Said base platform must be sufficiently rigid. The base platform 10 can even receive control components and power electronics. As an option, it is also possible for the carrier plate 12 or the drive surface 13 to be a component of the base platform 10. The base platform 10 offers the base or the element for arranging further functional units. The base platform 10 is furthermore the base or the element for arranging other transport systems. The base platform 10 is to be compatible with other base platforms. The movers 20 are arranged on the surface of the base platform 10 on the drive surface 13 and said movers can move relative thereto. For this purpose, the drive surface 13 or the carrier plate 12 generates a driving force that acts on the mover 20 and causes said mover to move in the desired manner The stationary drive surface 13 is preferably embodied in a planar manner. The mover 20 is controlled in such a manner that it can be displaced and/or rotated at least in two degrees of freedom. As a result, it is possible in particular to approach different stations in a flexible manner as described hereinunder if the drive surface 13 connects said stations in a suitable manner.

The mover 20 describes the movable element of the device 8. On the one hand, the mover 20 is used to produce a relative movement with respect to the carrier plate 12 or the drive surface 13. Furthermore, an interaction occurs between the movers 20 or between the mover components. Furthermore, the mover 20 generates a force on the carrier plate 12 or the drive surface 13. For this purpose, the mover 20 comprises at least one means for generating a magnetic field, in particular a magnet, preferably a permanent magnet 19, which cooperates with coils 18 of the carrier plate 12 or of the drive surface 13, said coils generating a travelling magnetic field so as to produce a movement. An air gap is formed between the carrier plate 12 or the drive surface 13 and the mover 20, so that a contactless movement of the mover 20 relative to the drive surface 13 can be performed. Furthermore, the mover 20 can comprise means for detecting a position.

In one view in FIG. 1, the mover 20 is illustrated in a perspective view. A lower face 17 of the mover 20 cooperates with the carrier plate 12 or the drive surface 13. Multiple permanent magnets 19 are arranged on the lower face 17 of the mover 20. The magnetic fields of permanent magnets 19 that are arranged adjacent to one another are different. Essentially, the lower face 17 comprises 4 fields having in each case multiple permanent magnets 19. The middle region of the lower face 17 does not comprise any permanent magnets 19. A movable part 42 is arranged in this region. The movable part 42 can move relative to a base body 31, the two components are components of the mover 20. WO 2013/059934 A1 discloses yet further alternative embodiments that are included in the disclosure of the present application. The mover 20 is surrounded by a collision protector 23 which is advantageous in the case of a number of moved movers 20. The base body 31 multiple permanent magnets 19 that form in each case four magnet arrays 41. A cover plate 34 is arranged above the four magnet arrays 41. At least the magnet arrays 41 and the cover plate 34 form the base body 31. Furthermore, the mover 20 comprises at least one movable part 42 that is connected to the base body 31 in the manner that a relative movement with respect to the base body 31 is possible. In particular, the movable part 42 is to be arranged in such a manner that it can move relative to the base body 31 towards the drive surface 13. The movable part 42 can quite easily comprise multiple moveable parts that are connected to the movable part 42. It is also feasible that the further movable parts can also be moved relative to the first movable part or can be moved by means of the first movable part.

The carrier plate 12 or the drive surface 13 represent a multi-layer component in accordance with FIG. 1. It comprises the following basic functionalities. On the one hand, it comprises means for producing a relative movement with respect to the mover 20. Furthermore, a force is generated that acts on the mover 20. Furthermore, said carrier plate comprises means for producing spaces (air gap) between the carrier plate 12 and the mover 20. Furthermore, the carrier plate 12 comprises means for detecting positions and also means for detecting energy transmission and means for transmitting information.

Figure 2:
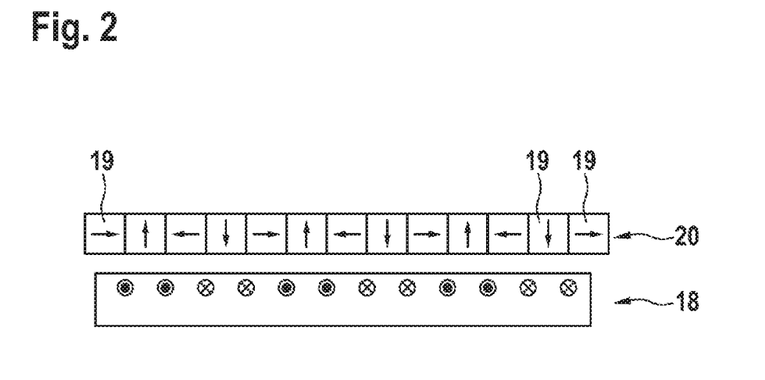
FIGS. 2 and 3 illustrate sectional views of the mover and the coil plane.

The view in FIG. 2 illustrates the general principle of how the magnets cooperate with a layer of the stator winding in the tiles in a coordinate x or y. The mover 20 and the coil plane 18 of the drive surface 13 or of the stator of the planar drive are illustrated in the side view. The orientation of the magnetic fields of the magnet poles of adjacent permanent magnets 19 are different as indicated by the arrows. After one pole pair comprising four different directions of the magnetic fields, the arrangement of the magnets 19 having the associated magnetic fields is repeated. The coil plane 18 is located below the mover 20 and its permanent magnets 19, the coils of said coil plane being influenced by currents in a specific direction in such a manner that the mover 20 moves. The coil spacing or the spacings between the conductors of the coil plane 18 correspond to the dimensions of the individual permanent magnets 19.

Figure 3:
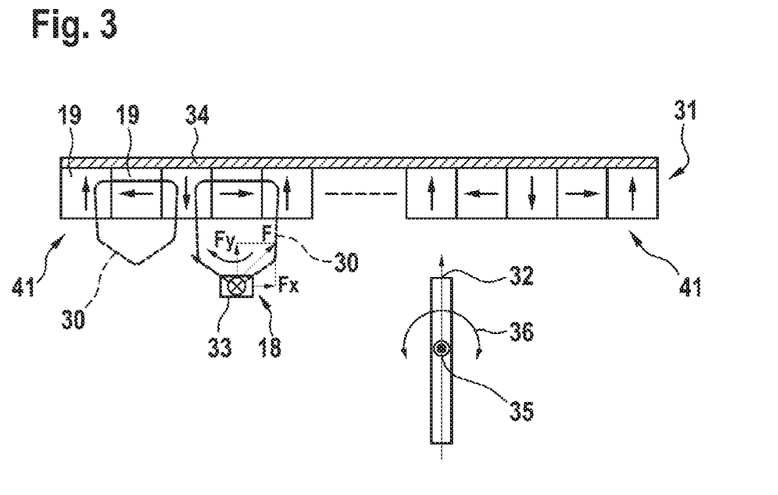

In the view in accordance with FIG. 3 for a specific embodiment of the drive, the differently oriented permanent magnets 19 are arranged on the lower face of the cover plate 34 so that the base body 31 is formed. By way of example, only one conductor of the coil plane 18 is illustrated with its associated current loading 33. In turn, said conductor is part of a magnetic circuit having a magnetic flux 30. It is evident that the mover 20 aligns itself when there is a flow of current. The permanent magnets 19 of the mover 20 are automatically aligned in the x-y direction in the rectangular current loading 33 of the drive surface 13 of the stator. In the case of a deflection in the plane x-y, a stabilizing torque 36 such as indicated by way of example by the double arrows is produced. The current conductor of the coil plane 18 likewise generates a magnetic field and the magnetic field line 35 of said magnetic field is likewise indicated. If the flow of current is interrupted, the drive surface 13 no longer produces a torque that acts on the mover 20. As yet further explained hereinunder, this effect can be used so that a movement that then occurs can be used to automatically lower a movable part 42.

Figure 4:
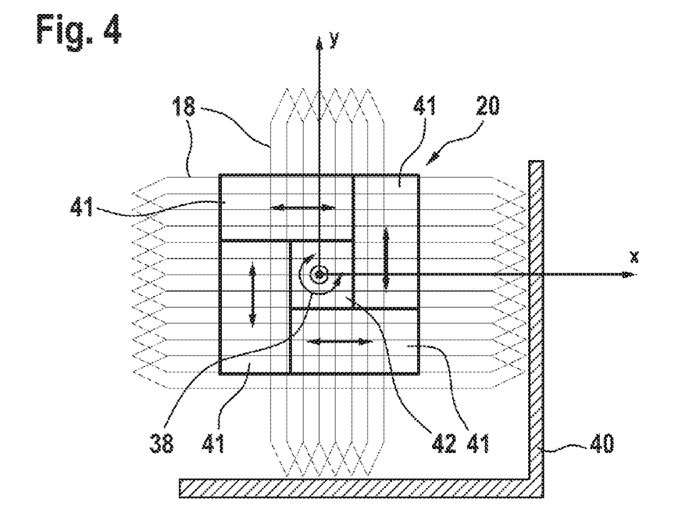
FIG. 4 illustrates a mover with an associated arrangement of the Halbach systems relative to the coil plane in a plan view showing the flow of current.

In the case of the exemplary embodiment in accordance with FIG. 4, the mover 20 is located in the illustrated orientation over the windings 38. The windings 38 extend in an orientation both in the X-direction and also in the Y-direction. As already illustrated in conjunction with FIG. 1, the mover 20 comprises at least four magnetic field arrays 41. These are magnetized in the manner illustrated by the double arrow. In the case of a flow of current through the windings 38 in the stator, the mover 20 aligns itself in the illustrated manner, namely in the X-Y direction which is indicated by a stabilizing torque 38 in the X-Y plane. The movable part 42 that is lying in the middle of the mover 20 is surrounded by the four magnetic field arrays 41. The coil planes 18 in the X- or Y-directions are supplied by means of corresponding voltages supplies 40 in the stator.

Figure 5:
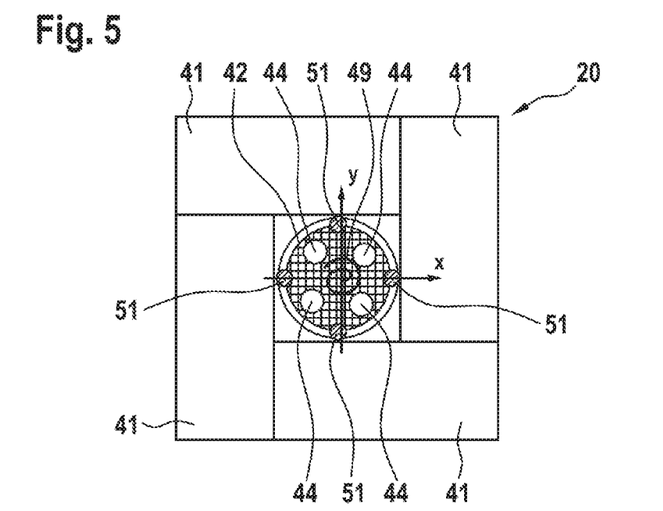
FIG. 5 illustrates a plan view of the mover with a round, movable middle part.

In the illustration in accordance with FIG. 5, the movable part 42 is illustrated more precisely in the plan view of the mover 20. The movable part 42 is round in shape. It can move relative to the surrounding magnetic field arrays 41, namely rotate about the Z-axis and move downwards. The rotary movement is supported by means of a torsion means 49 such as by way of example a torsion spring. The torsion means 49 is connected both to the movable part 42 and also to the base body 31 of the mover 20 or to the magnet array 41. Furthermore, multiple guiding elements 51 are provided that lead to the relative movement of the movable parts 42 relative to the other part of the mover 20. For this purpose, by way of example four balls are provided as guiding elements 51 that are guided in a spiral-shaped helical groove 57 (cf. FIGS. 6, 7) that is formed in each case by the outer face of the movable part 42 and the inner faces of the respective adjacent magnet arrays 41. Moreover, the movable part 42 comprises a preferably movable ferromagnetic part 53, by way of example a ferromagnetic grid. Consequently, the movable part 42 rolls on by way of example four balls 51 over the helical groove of the outer part 41. Essentially, the round, movable part 42 comprises a non-ferromagnetic and non-electrical material but the embedded grid 53 is embodied from a ferromagnetic material. The spacing in this grid 53 corresponds to the winding spacing of the coil plane 18 of the stator. In lieu of the ferromagnetic grid 53, it is also possible to provide other ferromagnetic elements that can be embodied in the axis X-Y of the mover 20 from an intensely magnetic anisotropic material. Moreover, four springs 44 that act in the Z-direction are indicated in the plan view. In the energized state, the base body 31 and the movable part 42 of the mover 20 are aligned in a direction X-Y. In the non-energized state, the movable part 42 rotates relative to the base body 31 under the influence of the torsion means 49. If the system is configured so that the friction at the slide surfaces of the guiding elements 51 is minimal, it is possible to forego the springs 44 in the Z-direction.

Figure 6:
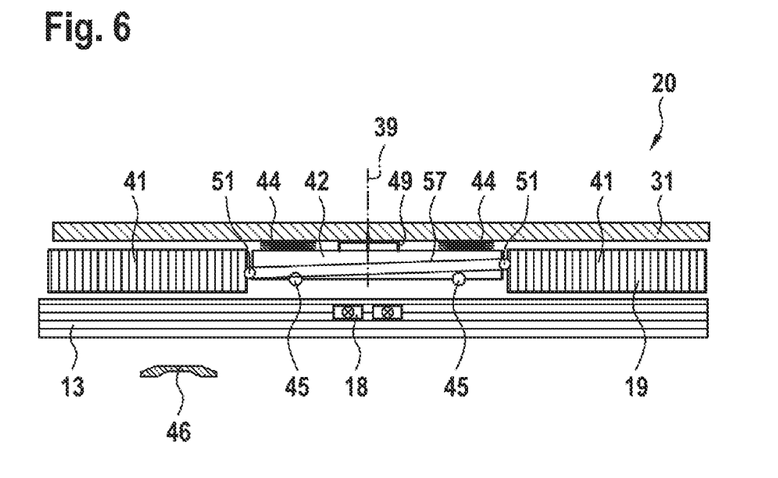
FIG. 6 illustrates a sectional view of the mover shown in FIG. 5 in this case a side view during normal operation.

The exemplary embodiment in accordance with FIG. 5 is illustrated in the sectional view in FIG. 6 in the normal operation, if in other words current is flowing through the coil plane 18. The movable part 42 is not yet in the lowered state. Moreover, the helical groove 57 is evident that is provided with a specific incline with regard to the lower face of the movable part 42 so as to cause the movable part 42 to move downwards in the Z-direction. Thus, the rotary movement of the torsion means 49 is converted into a translatory movement in the Z-direction.

Figure 7:
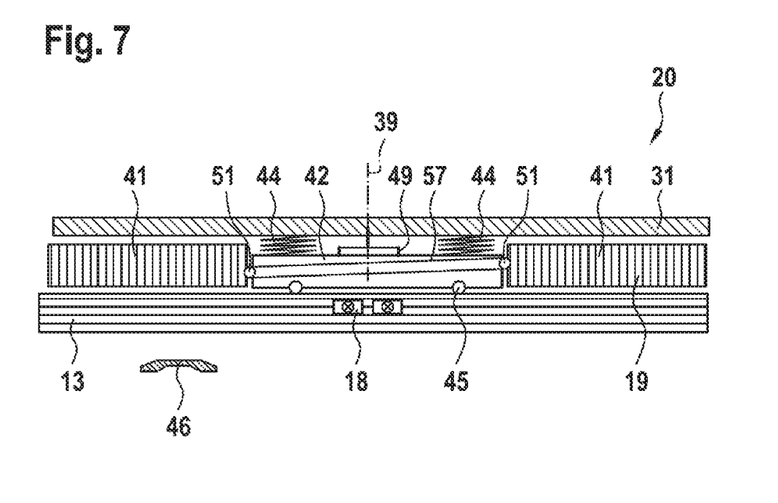
FIG. 7 illustrates a sectional view of the mover shown in FIG. 5 in this case a side view in the safeguarded or lowered operational mode.

FIG. 7 illustrates the movable part 42 in the lowered state. As soon as the current through the coil plane 18 disappears in the event of a malfunction, the movable part 42 automatically rotates relatively with respect to the base body 31 or the drive part 41 of the mover 20. As a result, the position of the movable part 42 is lowered with respect to the drive part 41. The movable part 42 is much lighter [is embodied above all from a synthetic material] and above all has essentially less inertia than the base body 31 having associated magnetic field arrays 41. As a consequence, the movement of the movable part 42 is very quick with regard to the base part 31 or the drive part 41 and moves initially in the Z-direction towards the drive surface 13 of the stator. As a consequence, the mover 20 is protected against greater damages and an emergency operational mode is rendered possible by way of example by means of rolling or braking (by means of the friction elements installed in the receiving devices of the balls 45). The lowering of the movable part can also be triggered by way of example if specific actual variables are below a specific set threshold value, by way of example the current loading of the coil plane 18, an automatic lowering by way of example. This can indicate a safety-critical operating state with respect to safety, by way of example a loss of current.

Figure 8:
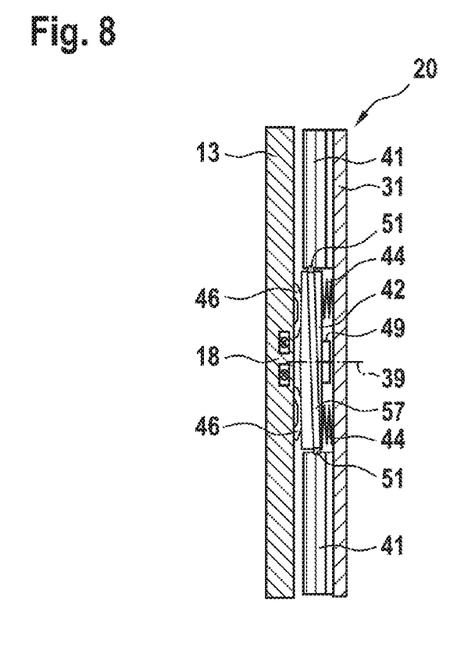
FIG. 8 illustrates a sectional view of the motor shown in FIG. 5 in this case in the safeguarded or lowered operational mode in the case of a vertical drive surface.

The exemplary embodiment in accordance with FIG. 8 differs from that in FIGS. 5 to 7 by virtue of the fact that the drive surface 13 is no longer horizontal but rather is arranged in a vertical manner. The structure of the mover 20 is essentially not different. Merely, suction elements 46 are provided in lieu of the balls or bearing elements 45. FIG. 8 illustrates the emergency operational mode. For this purpose, the movable part 42 has been lowered with respect to the base body 31 so that the suction elements 46 have been pressed against the vertical surface of the drive surface 13. As a consequence, the mover 20 is fixed with the drive surface 13 in the emergency operational mode.

Figure 9:
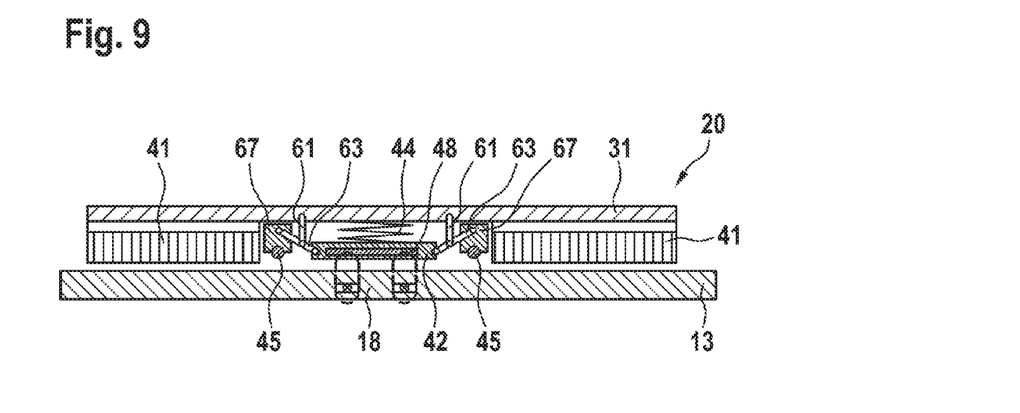
FIG. 9 illustrates a sectional view of an alternative exemplary embodiment during the normal operation.
Figure 10:
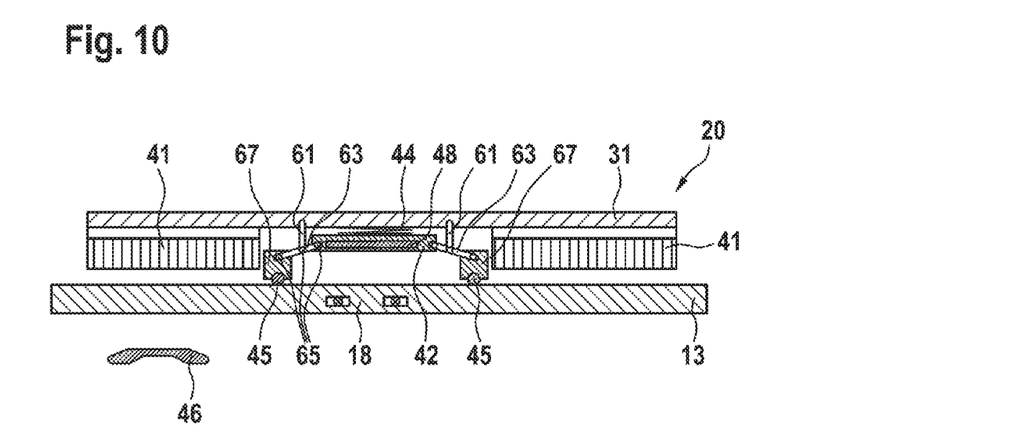
FIG. 10 illustrates a sectional view of the alternative exemplary embodiment in accordance with FIG. 9 in the safeguarded operation.

In a further alternative exemplary embodiment in accordance with FIGS. 9 and 10, the movable part 42 is automatically lowered by virtue of reversing the attractive force. The movable part 42 comprises at least one ferromagnetic element 48. In the exemplary embodiment, the ferromagnetic element 48 is embodied in a plate-shaped manner. The ferromagnetic element 48 is by way of example a so-called soft magnetic component (SFC). These materials usually hinder the formation of eddy currents. Eddy currents are to be avoided particularly during a movement of the mover 20 since they would lead to additional power losses, temperature increase and reduction of the driving force.

The movable part is connected by way of a spring 44 to the lower face of the base body 31 in such a manner that said movable part can move. At least one frame part 67 is provided at the side of the movable part 42. Two frame parts 67 are provided in the exemplary embodiment. These frame parts 67 are connected to the movable part 42 in each case by way of at least one about the steering lever 63 moving. A bearing 65 is provided in the middle region of the deflecting lever 63 and one end of a fastening 61 is moveably mounted by way of said bearing. The other end of the fastening 61 is fixed to the lower face of the base body 31. At least one bearing means 45 such as a ball, roller or other means is located on the lower face of the frame part 67. In the normal operation in accordance with FIG. 9, the magnetic field of the coil arrangement 18 exerts such a large attraction force on the ferromagnetic element 48 that the attraction force is greater than the resilient force of the spring 44. The frame or the two frame parts 67 having the bearing means 45 is or are raised by way of the lever mechanism embodied from the fastening 61, the deflecting lever 63 and the deflecting bearing 65. The mover 20 floats in the normal operation over the drive surface 13 of the stator under the influence of the electromagnetic forces between the coil plane 18 and the mover 20. In the emergency operational mode in accordance with FIG. 10, the current through the coil plane 18 drops to below a predetermined limit value. The resilient force of the spring 44 is then greater than the electromagnetic force that acts on the ferromagnetic plate 48 by means of the current through the coil plane 18. The spring 44 draws the movable part 42 upwards in the direction of the lower face of the base body 31. The corresponding lever mechanism 61, 63, 65 moves the frame parts 67 downwards in the direction of the surface of the drive surface 13. The bearing means 45 such as the ball or roller lie on the surface of the drive surface 13. If the current subsequently flows through the coil plane 18, the middle part 42 together with the ferromagnetic element 48 that is located therein is drawn back in the downwards direction, as a consequence of which the frame parts 67 are folded upwards. The device moves back into the starting point as illustrated in FIG. 9.

Figures 11, 12:
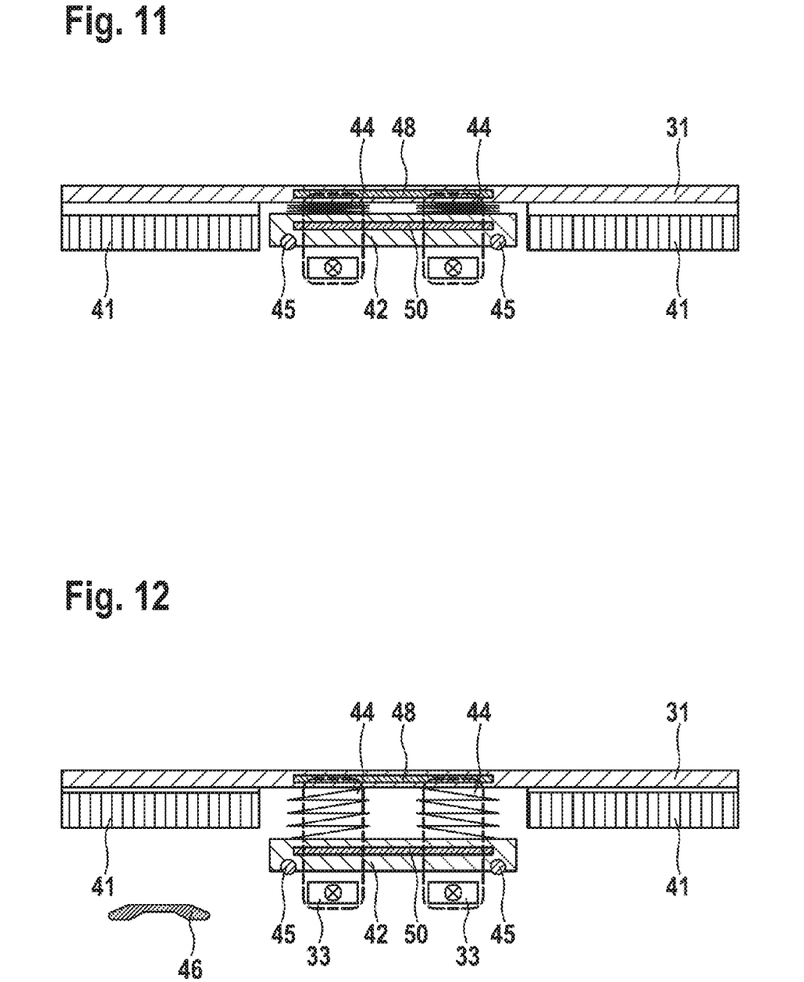
FIG. 11 illustrates a further alternative exemplary embodiment of a mover having frame parts, which can be lowered, and a ferromagnetic plate Sleep during the normal operation.
FIG. 12 illustrates the exemplary embodiment in accordance with FIG. 11 in the safeguarded or lowered operational mode.

A further exemplary embodiment in accordance with FIGS. 11 and 12 differs from that in FIGS. 9 and 10 by virtue of the fact that in each case a ferromagnetic element 48, 50 is provided additionally in the base body 31 and in the movable part 42. As soon as there is a flow of current, the field lines also extend as illustrated in FIG. 11 through the ferromagnetic element 48,50. As a consequence, the two ferromagnetic elements 48,50 draw towards one another. As a consequence, the springs 44 are compressed. The ferromagnetic elements 48, 50 are by way of example so-called soft magnetic components (SFC). These materials usually hinder the formation of eddy currents. Eddy currents are to be avoided particularly during a movement of the mover 20. If there is no longer a flow of current, the two ferromagnetic elements 48, 50 are no longer drawn towards one another. The springs 44 are consequently able to push the movable part 42 downwards. As a result, the rollers 45 that are located on the lower face of the movable part 42 can be placed on the surface of the drive surface 13.

Figure 13:
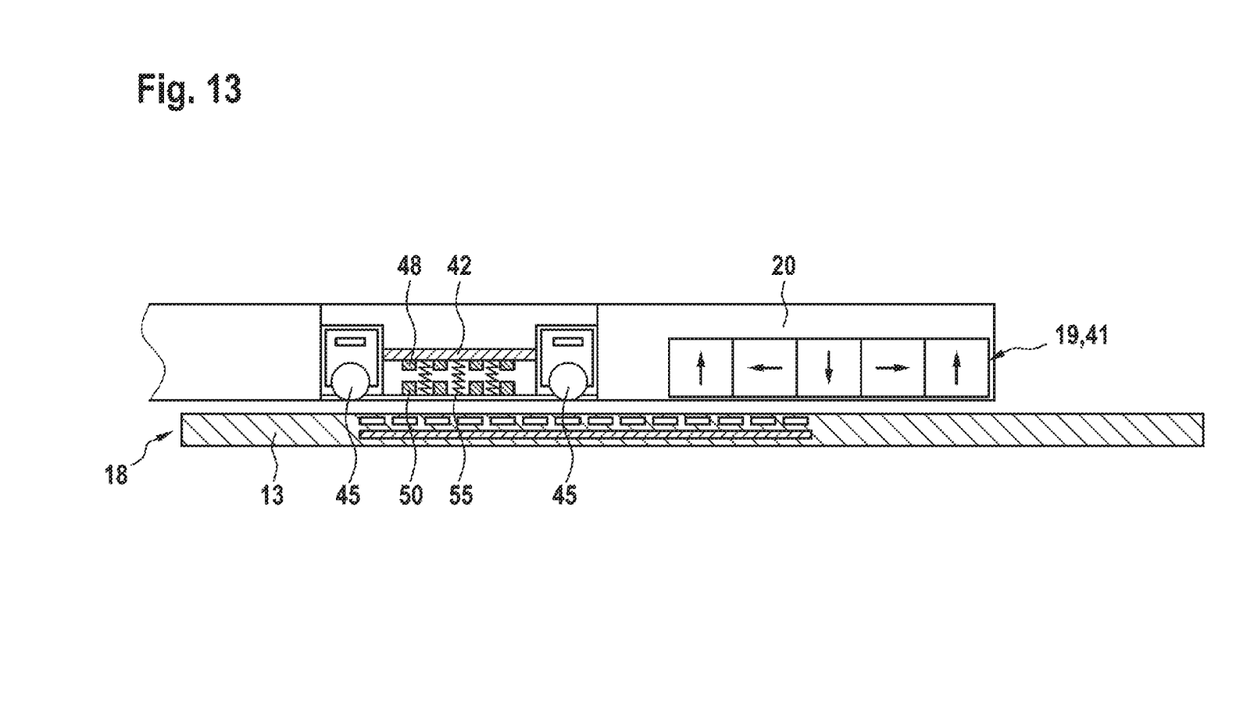
FIG. 13 illustrates a further alternative exemplary embodiment of a mover having two ferromagnetic plates in the cut-away side view.

The exemplary embodiment in accordance with FIG. 13 is characterized by means of a self-actuating mechanism in the event of a failure of the movable part 42. The illustrated directions of the magnetic fields are formed. In addition, a ferromagnetic element 48, 50 is provided in each case in the base body 31 and in the movable part 42. As soon as a current is flowing, the field lines extend as illustrated in FIG. 6 also through the ferromagnetic element 48, 50. As a consequence, the two ferromagnetic elements 48, 50 are drawn towards one another. As a consequence, the springs 44 are compressed. The ferromagnetic elements 48, 50 are by way of example so-called soft magnetic components (SFC). These materials usually hinder the formation of eddy currents. Eddy currents are to be avoided particularly during a movement of the mover 20. If there is no longer a flow of current, the two ferromagnetic elements 48, 50 are no longer drawn towards one another. The springs 44 are consequently able to push the movable part 42 downwards. As a result, the rollers 45 that are located on the lower face of the movable part 42 can be placed on the surface of the drive surface 31. The coil plane 18 in accordance with FIG. 6 is illustrated in a sectional view. It is evident that the windings 38 are embodied as also illustrated in FIG. 4 in a vertical manner with respect to one another. In the case of the upper conductor tracks, multiple conductor tracks are evident in the sectional view, whereas in the case of the plurality of the lower conductor tracks merely a single conductor track is illustrated in this view.

All exemplary embodiments have in common that a change in the magnetic field that is generated by the coil plane 18, in particular if a magnetic field is no longer acting on the mover 20, causes the movable part 42 to move. In the normal operation, if a current flows through the coil plane 18, the mover 20 is automatically moved into a predetermined orientation in the X-Y-plane. A corresponding stabilizing torque or alignment torque 38 is indicated in FIG. 3. If the flow of current flow stops, the mover 20 is no longer influenced by a magnetic field. As a consequence, this alignment torque 38 is also no longer generated. The mover 20, comprising at least the base body 31 and the movable part 42 rotates back in the X-Y direction. Furthermore, it is possible by virtue of suitably providing ferromagnetic parts 48, 50, 53 in the movable part 42 purposefully in the energized operation to generate a magnetic field that draws the movable part 42 towards the coil plane 18 and thus exerts a corresponding force in the Z-direction. If the magnetic field ends, when current is no longer flowing through the coil plane 18, force is also no longer exerted on the movable part 42. This corresponding attraction force that often overcomes a resilient force is converted into a translatory movement of the movable part 42 in the Z-direction. As a consequence, the movable part 42 moves relative to the base body 31 in the direction towards the coil plane 18.

The device is a component of a flexible transport system for different transport applications, in particular for applications in the technology of packaging pharmaceutical products or foodstuffs. The application is however not limited thereto.

What is claimed is:

1. A transport device, comprising:
    at least one mover, including:
        at least one base body;
        multiple permanent magnets connected to the at least one base body, the permanent magnets configured to cooperate with at least one coil plane of a drive surface to drive the at least one mover in a contactless manner; and
        at least one movable part connected to the at least one base body and configured to move relative to the at least one base body,
    wherein the at least one movable part is configured to bring the at least one mover into mechanical contact with the drive surface when the at least one movable part is in a lowered state.

2. The device according to claim 1, wherein at least one movement of the at least one movable part relative to the at least one base body is performed in dependence upon at least one of a magnetic field that is generated by the at least one coil plane and a change in the magnetic field that is generated by the at least one coil plane.

3. The device according to claim 2, wherein the at least one movable part is configured to move back into a starting position when a further change of the magnetic field occurs.

4. The device according to claim 1, wherein the at least one movable part comprises at least one ferromagnetic part.

5. The device according to claim 1, wherein the at least one movable part comprises at least one bearing mechanism.

6. The device according to claim 5, wherein the at least one bearing mechanism is one of a roller, a ball, and a suction element.

7. The device according to claim 1, wherein the at least one movable part is connected to the at least one base body by at least one movement mechanism.

8. The device according to claim 7, wherein the at least one movement mechanism is a spring.

9. The device according to claim 1, further comprising:
    at least one guiding element arranged between the at least one base body and the at least one movable part.

10. The device according to claim 9, wherein the at least one guiding element is configured to cooperate with a helical groove that is formed between the at least one base body and the at least one movable part.

11. The device according to claim 1, wherein a ferromagnetic grid is used as a ferromagnetic part and/or is embodied from magnetic anisotropic material.

12. The device according to claim 11, wherein the ferromagnetic grid comprises an identical spacing to that of the at least one coil plane.

13. The device according to claim 1, wherein the at least one movable part includes at least one further frame part connected by a lever mechanism to the at least one movable part.

14. The device according to claim 1, wherein the at least one movable part has a lower mass inertia than the at least one base body.

15. The device according to claim 1, wherein the at least one movable part is arranged in a middle region of the at least one mover and/or is surrounded by at least one magnet array.

* * * * *